June 30, 1925.
C. F. JENKINS
OBJECTIVE LENS
Filed Feb. 5, 1921
1,544,155
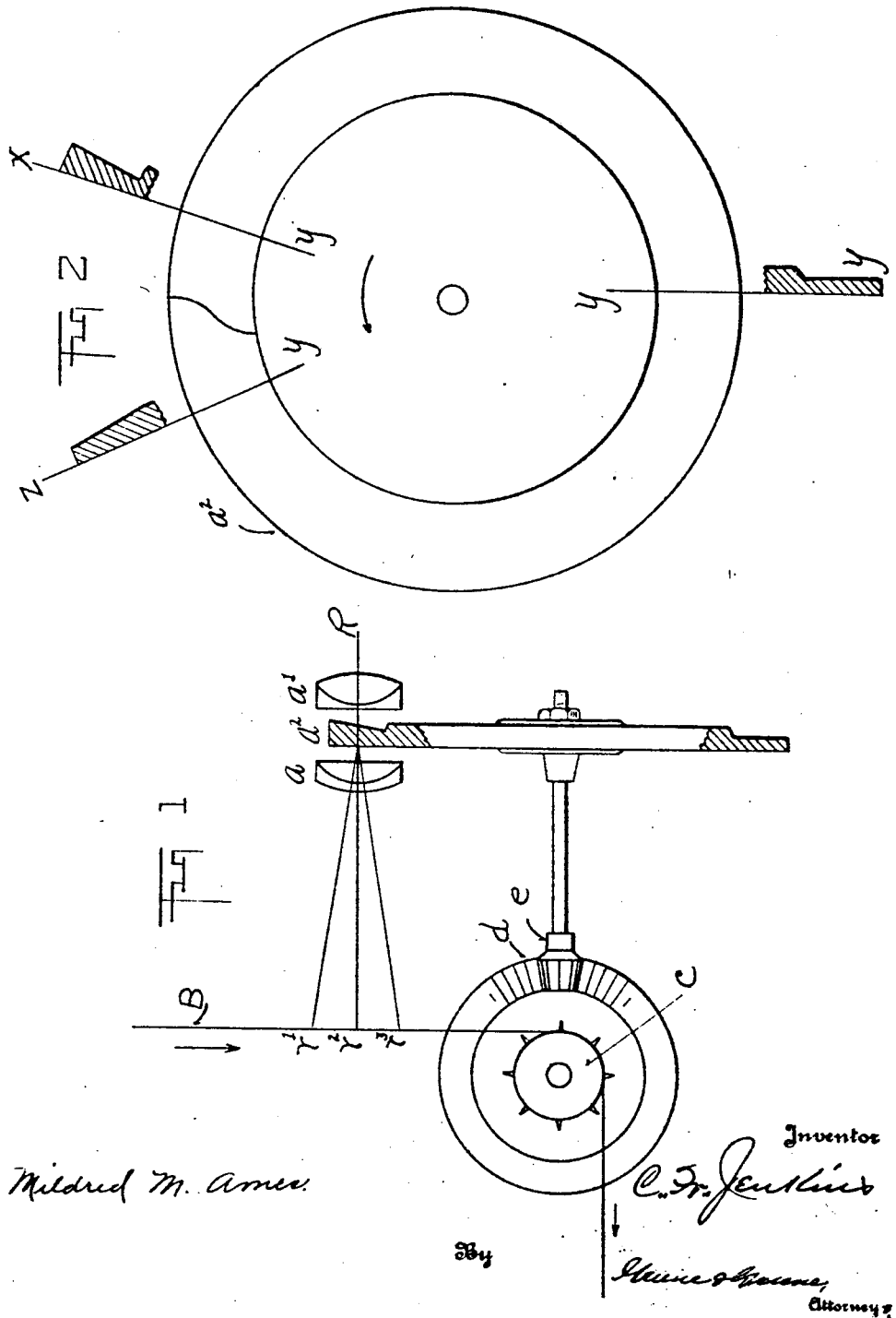

Patented June 30, 1925.

1,544,155

UNITED STATES PATENT OFFICE.

CHARLES FRANCIS JENKINS, OF WASHINGTON, DISTRICT OF COLUMBIA, ASSIGNOR TO DISCROLA, INC., OF WASHINGTON, DISTRICT OF COLUMBIA, A CORPORATION.

OBJECTIVE LENS.

Application filed February 5, 1921. Serial No. 442,870.

*To all whom it may concern:*

Be it known that I, CHARLES FRANCIS JENKINS, a citizen of the United States, and resident of Washington, District of Columbia, have invented certain new and useful Improvements in Objective Lenses, of which the following is a specification, reference being had therein to the accompanying drawing.

The general object of this invention is to provide in place of the usual lens a device which variably and progressively bends a ray of light which it transmits and in such manner that it has a constant path on one side of said device and a varying path on the opposite side. This is accomplished by using a device having a member of progressively varying cross-section arranged to move across the axis of two fixed lens elements.

One way of reaching the desired result is shown in the accompanying diagrammatic drawings wherein motion picture apparatus is used for illustration, although the invention is not limited to that particular art.

In the drawings,

Fig. 1 is an elevation, partly in section, showing apparatus which embodies the invention.

Fig. 2 shows a relatively movable refracting element in side view, this element being a glass disk, and radial sections of the marginal portion of the disk being shown alongside the section lines.

In these views, $a, a'$ are two fixed outer lens elements of a compound device, $a^2$ is an intermediate variable, ray-bending member, B a motion picture film fed by a sprocket drum $c$ rotated by devices not shown to draw down the film strip across the axial line of the lens replacing device. With the drum rotates a gear $d$ which engages a pinion $e$ carrying on its shaft the member $a^2$, which is here shown as a glass disk having a peripheral annular portion laterally cut away in such manner that a radial section on a line $x$—$y$ is prismatic and has its wider end at the margin of the disk. This margin, in passing around the disk, gradually decreases in thickness while the opposite margin gradually increases, until a point near the line $x$—$y$ is reached where a section $z$—$y$ is prismatic but with its inner end the wider. A section on the line $y$—$y$, midway between the other lines of section is rectangular, the opposite broad sides of this section being parallel.

The distance between the lines $x$—$y$, $z$—$y$ is not invariable but the face at $x$—$y$ passes by a somewhat sharp incline into the oppositely inclined face at $z$—$y$. The form of the section at each section line is shown alongside the corresponding line.

The sprocket drum and peripheral zone of the disk move at predetermined relative speeds, in this instance the advance of the film is through a space equal to the width of a picture space during the time in which the disk makes a complete revolution, since in the form illustrated there is but one complete cycle of thickness variation in passing around the circle, which may be too small to admit of repeating the cycle during a single rotation. The light ray or rays passing in either direction through the lens replacing device will be bent by the member $a^2$, always toward the thicker side of that portion which at a particular instant is interposed, so that at the line $x$—$y$ the ray will follow the path between R and $r'$, at $y$—$y$ the path between $r^2$ and R, and at $z$—$y$ the path R, $r^3$, as indicated in Fig. 1. If, then, a point on the film moves from $r'$ to $r^3$ while the disk makes one revolution, a ray of light in fixed position on the right side of the lens replacing device of Fig. 1 will swing with film from $r'$ to $r^3$, as if hinged.

This construction, substantially, can be used to form a picture on a continuously moving sensitizend film or to project a picture already formed and carried across the axis of the variable refracting device by continuous movement.

After the line $z$—$y$ reaches the axis, a slight further rotation brings the line $x$—$y$ to that axis and the whole operation is repeated indefinitely and at almost any desired speed.

What I claim is:

1. The combination with two fixed, slightly separated elements of a compound lens, of a relatively movable light refracting member of progressively varying refracting power and constructed continuously to change the angle between incident and emerging rays of light interposed between said elements, the general plane of the three parts, considered as a unit, being transverse to the path of an axial light beam approaching one side of said unit, and constantly cutting the axial line.

2. The combination with two fixed, slightly separated refracting elements of a compound lens, of a co-acting prismatic member interposed between said elements and adapted to refract progressively a light beam primarily directed along the axis of said lens, by continuously changing the angle between incident and emerging rays of light when moved with respect to said lens while keeping it in the path of said beam, and means for so moving said co-acting member.

3. The combination with two stationary, slightly separated refracting elements of a compound lens, of a rotary prismatic disk constantly cutting the axial line of said lens while interposed between said elements, the cross section of the disk's interposed portion progressively varying, and means for rotating the disk, whereby a light beam striking axially one side of the lens is progressively changed in direction, as it leaves the opposite site, substantially as set forth.

In testimony whereof I hereunto affix my signature.

CHARLES FRANCIS JENKINS.